United States Patent
Xiao

(10) Patent No.: US 9,992,214 B1
(45) Date of Patent: Jun. 5, 2018

(54) GENERATING MALWARE SIGNATURES BASED ON DEVELOPER FINGERPRINTS IN DEBUG INFORMATION

(71) Applicant: Palo Alto Networks, Inc., Santa Clara, CA (US)

(72) Inventor: Zihang Xiao, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 108 days.

(21) Appl. No.: 15/083,070

(22) Filed: Mar. 28, 2016

(51) Int. Cl.
| | | |
|---|---|---|
| *H04L 29/00* | (2006.01) | |
| *H04L 29/06* | (2006.01) | |
| *G06F 21/56* | (2013.01) | |
| *G06F 9/44* | (2018.01) | |

(52) U.S. Cl.
CPC ............ *H04L 63/1416* (2013.01); *G06F 8/73* (2013.01); *G06F 21/563* (2013.01); *G06F 2221/034* (2013.01)

(58) Field of Classification Search
CPC ....... H04L 63/1416; G06F 8/73; G06F 21/563
USPC .......................................................... 726/23
See application file for complete search history.

(56) References Cited

U.S. PATENT DOCUMENTS

2012/0079596 A1* 3/2012 Thomas ................ G06F 21/55
                                                              726/24
2014/0090061 A1* 3/2014 Avasarala ............. G06F 21/56
                                                              726/24

OTHER PUBLICATIONS

Moser et al., Limits of Static Analysis for Malware Detection, 23rd Annual Computer Security Applications Conference, 2007, pp. 421-430.
Schmidt et al., Static Analysis of Executables for Collaborative Malware etection on Android, Jun. 14, 2009.
Sung et al., Static Analyzer of Vicious Executables (SAVE), Dec. 6, 2004.

* cited by examiner

*Primary Examiner* — Brandon Hoffman
*Assistant Examiner* — Michael D Anderson
(74) *Attorney, Agent, or Firm* — Van Pelt, Yi & James LLP

(57) ABSTRACT

Techniques for generating malware signatures based on developer fingerprints in debug information are disclosed. In some embodiments, a system, process, and/or computer program product for generating malware signatures based on developer fingerprints in debug information includes receiving a sample, in which the sample includes a binary executable file; matching one or more paths in content of the binary executable file based on a plurality of patterns; extracting meta information from the one or more matched paths; and automatically generating a signature based on the extracted meta information.

20 Claims, 8 Drawing Sheets

602 ⤴

| id | pattern | format |
|---|---|---|
| 1 | C:\\Users\\.*\\Visual\ Studio\ 20..\\ | pe |
| 2 | \\Visual\ Studio\ 20..\\.*\\.*\.pdb | pe |
| 3 | /Users/.*/.*\.[o\|h\|c\|cpp\|m\|mm] | macho |
| 4 | /home/.*/.*\.[h\|c\|cpp\|asm] | elf |

| pattern_id | parser_file | parser_function |
|---|---|---|
| 2 | pe_vs1.py | parse_pe_vs1 |
| 3 | macho_1.py | parse_macho_1 |
| 1 | pe_vs2.py | parse_pe_vs2 |
| 4 | elf.py | parse_elf |

704 ⤴ <project>/parsers/
-- elf.py
-- macho_1.py
-- pe_vs1.py
-- pe_vs2.py

GENERATING MALWARE SIGNATURES BASED ON DEVELOPER FINGERPRINTS IN DEBUG INFORMATION

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 6 is a table of predefined patterns in accordance with some embodiments.

FIG. 7 is a table of predefined parsers and parser code in accordance with some embodiments.

DETAILED DESCRIPTION

Figure 1:
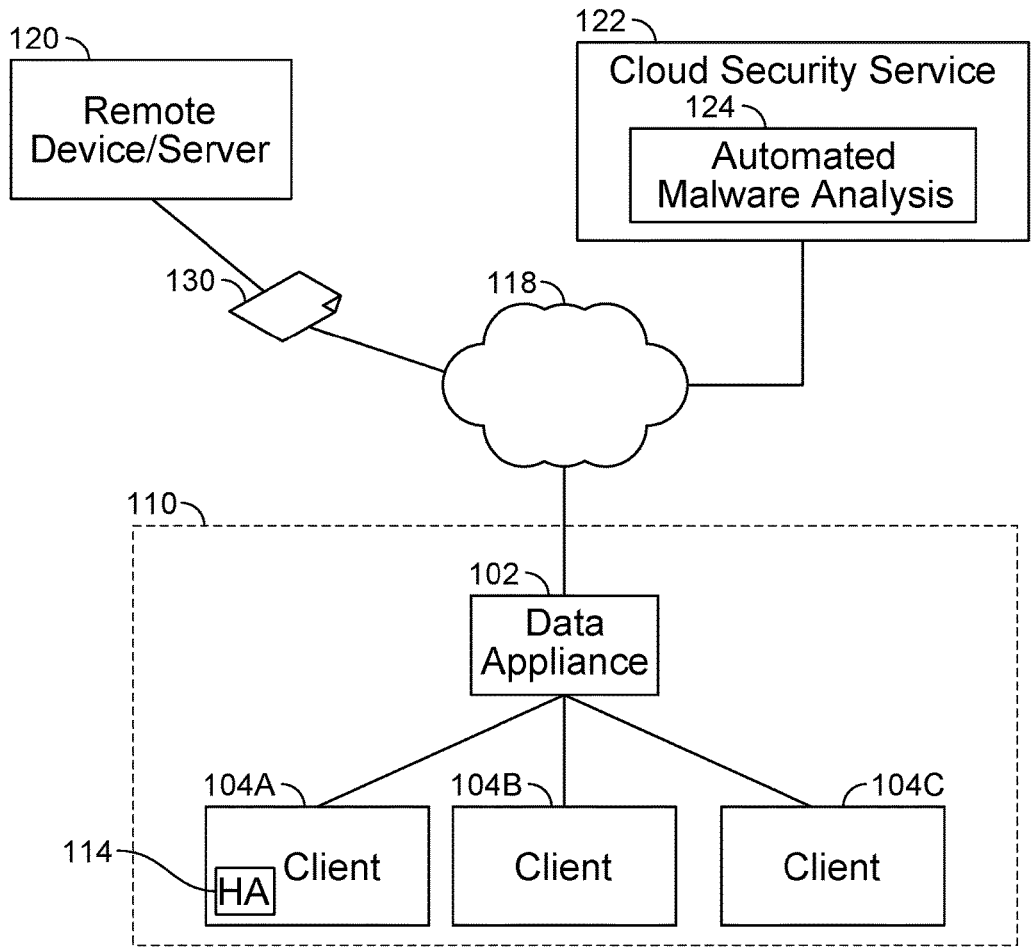
FIG. 1 is a functional diagram of an architecture of a system for generating malware signatures based on developer fingerprints in debug information in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, a significant challenge for security detection techniques is to identify threats (e.g., malware, which refers to malicious programs, such as programs attempting to perform malicious or undesired actions) attempting to use a new malware (e.g., a new variant of a previously detected malware or a new malware).

Overview of Techniques for Detecting Malware Based on Developer Fingerprints in Debug Information For example, most existing methods to generate malware family signatures can be classified into one of the following two categories: (1) generating signatures from many known malware samples based on statistics, information clustering, or machine learning approaches; and (2) generating signatures from a single sample or a few samples based on experienced security/malware analysts' manual review and analysis. The first category is an approach that can be automated but generally requires acquiring/accumulating many known samples. As such, there is a paradox that in order to generate family signatures, enough samples that are known in the malware family are needed, but before any malware family signatures can be generated, how can it be determined which samples belong to the malware family? The second category is an approach that generally requires manual work of security/malware analyst experts to determine unique attributes that can represent an entire malware family.

However, the disclosed techniques for detecting malware based on developer fingerprints in debug information can be used in both of the above-described situations. For example, if there is only one or a few known samples in a given malware family, the disclosed techniques can be applied to generate a signature from developer fingerprints and their derived information. As further described below, this generally will provide for a high detection rate as well as a low false positive rate as a result of the disclosed techniques' selection of fingerprints that are generally associated with the malware's authorship and its original project and are generally relatively unique (e.g., generally will not be associated with other malware (e.g., written by different malware authors) or benign content/software). In addition, if there are many samples in a given malware family, the developer fingerprints and their derived information can still be used as part of existing approaches, which can facilitate improved results for generated malware family signatures, such as will now be further described below.

Thus, what are needed are new and improved techniques for detecting malware based on developer fingerprints in debug information.

Accordingly, various techniques for detecting malware based on developer fingerprints in debug information are disclosed.

In some embodiments, a system, process, and/or computer program product for generating malware signatures based on developer fingerprints in debug information includes receiving a sample, in which the sample includes a binary executable file; matching one or more paths in content of the binary executable file based on a plurality of patterns; extracting meta information from the one or more matched paths; and automatically generating a signature based on the extracted meta information.

For example, the automated malware analysis can include performing a static analysis. The signature can be a malware family signature (e.g., a unique signature for identifying the malware family) that is generated based on the extracted meta information (e.g., extracted strings or fields, which are not executable code, such as compiler generated meta data that is included within the binary executable file and can be extracted from the binary executable file), and the binary executable file can be associated with the malware family based on the extracted meta information (e.g., or a subset of the extracted meta information).

In one embodiment, a system, process, and/or computer program product for generating malware signatures based on developer fingerprints in debug information further includes sending the signature to a firewall device or host agent.

In one embodiment, a system, process, and/or computer program product for generating malware signatures based on developer fingerprints in debug information further includes performing an action based on the signature.

In one embodiment, a system, process, and/or computer program product for generating malware signatures based on developer fingerprints in debug information further includes performing an action (e.g., a remedial action or other action) if a malware sample is determined to be malware based on a match of the signature. For example, the action can include one or more of the following: block the malware sample from downloading, block the malware sample from installing, block the malware sample from executing, generate a warning about the malware sample, and log the malware sample.

In one embodiment, a system, process, and/or computer program product for generating malware signatures based on developer fingerprints in debug information further includes receiving one or more samples (e.g., in which the samples each include executable files and are known to be associated with a given malware family) at a cloud security service, in which the cloud security service performs the disclosed techniques to automatically generate the signature.

In one embodiment, a system, process, and/or computer program product for generating malware signatures based on developer fingerprints in debug information further includes generating malware signatures (e.g., high quality malware family signatures) based on only one or a few malware samples (e.g., in which the samples each include executable files and are known to be associated with a given malware family). For example, the disclosed techniques can also provide useful information to other existing signature generation systems or methods, or to analysts to manually write signatures, and can improve their quality.

In one embodiment, a system, process, and/or computer program product for generating malware signatures based on developer fingerprints in debug information further includes parsing the binary executable file to extract unique patterns of data including debug information, debug symbols, and/or derived data (e.g., device/user fingerprint information associated with a malware author/writer) that can be used to generate the signature (e.g., malware family signature). For example, parsing the binary executable file to extract unique patterns of data can include information associated with a malware's author and original project, including a username, project name, project unique ID, project compiling location, source file structure, and/or other information associated with a malware's author and original project.

In one embodiment, a system, process, and/or computer program product for generating malware signatures based on developer fingerprints in debug information further includes verifying the signature based on testing with a plurality of other malware samples.

Accordingly, various techniques for generating malware signatures based on developer fingerprints in debug information are disclosed. For example, using such techniques can facilitate an efficient and enhanced detection of malware. As will be apparent to one skilled in the art in view of the various techniques and embodiments described herein, while some of the various techniques described herein for generating malware signatures based on developer fingerprints in debug information are described with respect to various computing environments (e.g., using a cloud security service), such techniques can similarly be applied to various other security environments, including, for example, performed in part or completely using security devices such as appliances, gateways, servers, and/or other security platforms capable of implementing the techniques disclosed herein and/or using host-based implementations for similarly performing the disclosed techniques for generating malware signatures based on developer fingerprints in debug information.

Overall System Architecture for Generating Malware Signatures Based on Developer Fingerprints in Debug Information FIG. 1 is a functional diagram of an architecture of a system for generating malware signatures based on developer fingerprints in debug information in accordance with some embodiments. For example, such an environment can detect and prevent malware from causing harm (e.g., malicious software can include any executable program, such as active content, executable code, and scripts, that can interfere with the operation of a computing device or computer network, attempt unauthorized access of data or components of a computing device, and/or perform various other malicious, unauthorized, and/or undesirable activities). In particular, a variety of attempts by a malicious individual to propagate malware (e.g., malware 130) via system 120 are described, as are techniques for thwarting that propagation or execution of such malware in protected network computing environments, such as for protecting computing devices within an enterprise network 110.

In the example shown in FIG. 1, devices 104A, 104B, and 104C are client devices (e.g., a laptop computer, a desktop computer, a tablet, a smart phone, and/or other types of client devices) present in an enterprise network 110. Data appliance 102 is configured to enforce policies regarding communications between clients, such as clients 104A and 104B, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Data appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104A by software executing on client 104A.

Whenever data appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

In one embodiment, one or more of the client devices 104A-104C include a host agent (HA) 114 as shown. For example, HA 114 can be implemented as a host-based firewall and/or an agent, such as a network/security agent, executed on the client/host device (e.g., implemented in software that can be executed on a hardware processor of the client/host device) that can perform various functions in coordination with data appliance 102 (e.g., which can include a firewall component), and/or a cloud security service 122 to facilitate endpoint protection and to facilitate the various techniques for generating malware signatures based on developer fingerprints in debug information, such as further described below. In an example implementation, HA 114 can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers) to facilitate endpoint security and automated signature generation based on developer fingerprints in debug information in coordination with appliance 102 and/or a cloud security service 122, such as further described below.

As will be described in more detail below, appliance 102 can be configured to perform malware analysis/prevention, including various techniques for providing detection of malware and, specifically, various techniques for generating malware signatures based on developer fingerprints in debug information as disclosed herein. As an example, data appliance 102 (e.g., and/or in coordination with HA 114) can be configured to provide a copy of malware 130 (e.g., a malware sample, which can include potentially malicious content) to locally perform the disclosed techniques for automated malware analysis and/or to send a copy of the malware sample to cloud security service 122, which includes an automated malware analysis system 124 as shown, to perform automated malware analysis of samples received from data appliance 102, HA 114, and/or other sources. In one embodiment, cloud security service 122 also performs the disclosed techniques for generating malware signatures based on developer fingerprints in debug information. As another example, cloud security service 122 can provide automatically generated signatures (e.g., a list of malware family signatures) to appliance 102 (e.g., and/or HA 114) as part of a subscription. The automatically generated signatures can be generated by service 122 in conjunction with the techniques described herein. For example, if service 122 identifies a malware family associated with the malware sample received from a data appliance (e.g., data appliance 102 or another data appliance), such as using various techniques for generating malware signatures based on developer fingerprints in debug information as disclosed herein, cloud security service 122 can automatically generate a new signature for the malware family and send the new signature to various subscribers (e.g., data appliance 102 and various other data appliances that receive subscription-based signature updates). In an example implementation, the cloud security service can be implemented using a commercially available security service, such as the WildFire™ cloud-based malware analysis environment provided by Palo Alto Networks, Inc.

Figure 2:
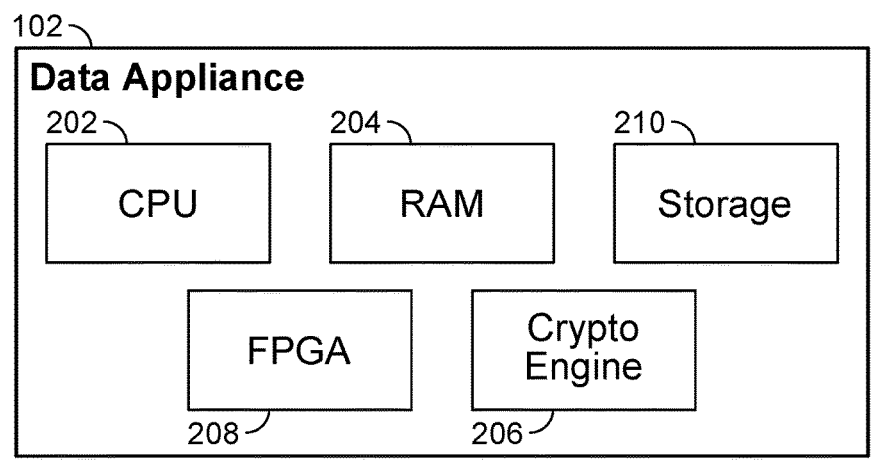
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Techniques for Generating Malware Signatures Based on Developer Fingerprints in Debug Information A variety of techniques for detection of malware based on developer fingerprints in debug information are disclosed. In one embodiment, the disclosed techniques can be applied to automatically generate high quality family signatures for malware on one or more platforms (e.g., malware families on Microsoft Windows, Mac OS X, Linux, Android, iOS, and/or other platforms). The disclosed techniques can be applied even in cases in which there is only one or a few malware samples available for a given malware family.

For example, given one or some PE (e.g., Windows executable files), ELF (e.g., Linux executable files), or Mach-O (e.g., Mac OS X and iOS executable files) format executable files that are pre-known in a malware family and include debug information in the binary executable file, the disclosed techniques can be performed to automatically match certain file paths from their debug information as developer fingerprints. The fingerprints can be parsed to produce more detailed information about a malware's author and original project, such as username, project name, project unique ID, project compiling location, source file structure, and/or other information. The fingerprints and detailed information can then be used in different ways to automatically generate malware family signatures or be used by existing signature generation approaches. The generated signatures can then be used to detect other known or unknown samples in the same malware family with a high detection rate and very low false positive rate, as further described below.

Malware Family Signatures

As discussed above, malware family signatures (e.g., family signatures) can be generated using various techniques. Generally, security technologies (e.g., security products/solutions, such as firewalls, host-based antivirus products/solutions on laptops/desktops/tablets/smart phones, cloud-based antivirus products/solutions, and/or other security products/solutions) can use a family signature to determine whether a data object (e.g., content, such as a file or a network traffic packet) is associated with (e.g., a member of) a known malware family.

For example, a malware family signature can be generated to represent one or more common attributes/characteristics of malware samples (e.g., also referred to as samples) in a given family to ensure an effective detection rate. The malware family signature should generally be unique enough that it does not occur in other families or benign files to avoid too many false positives. Malware family signatures with an effective detection rate (e.g., greater than a 99% detection rate or some other threshold accuracy level) and a low false positive rate (e.g., less than a 1% false positive rate or some other threshold accuracy level) are generally referred to herein as high quality malware family signatures.

Antivirus vendors typically use one or more of the following categories of information to generate malware family signatures: common piece of binary code, common URLs or strings in the samples, certificates or code signing, imported or exported functions or application programming interfaces (APIs), internal code pieces' control flow graph or internal functions' calling graph, and common configurations in data files. For example, samples in a virus family (e.g., an infection virus family) may be detected by their common code piece in the entry point; samples in a Trojan or backdoor family may be detected by the Command and Control (CnC) server's domain name or strings of commands.

As also discussed above, high quality family signatures can be generated by malware analysts (e.g., which requires security malware analysts with technical expertise and can be relatively time consuming and expensive). High quality family signatures can also be generated in an automated manner. In some cases, high quality family signatures can be generated using a combination of these manual and automated signature generation techniques, such as using semi-manual and semi-automatic signature generation techniques as described herein. Generally, a process for malware family signature generation includes the following stages in the process. As a first stage, a subset of information from samples to use for signature generation is selected. At a second stage, the selected information is extracted from samples (e.g., sets of samples for distinct malware families) to process (e.g., transform, cluster, statistics, and/or other operations for analyzing the extracted information can be performed). At a third stage, a machine learning algorithm or training models are performed to generate family signatures (e.g., automated family signature generation), the family signatures are manually created by a security analyst(s), or combinations thereof. At a fourth stage, the new family signatures are tested to evaluate their detection rates and false positive rates by applying the new family signatures to different sample sets, and/or manually review their quality.

The disclosed techniques for generating malware signatures based on developer fingerprints in debug information is focused on enhancing the above-described process for malware family signature generation. In particular, the disclosed techniques for generating malware signatures based on developer fingerprints in debug information can be applied to improve the first two steps of the above-described process for malware family signature generation (e.g., including what information to extract from samples and how to extract that information from the samples) and can also be used with any kind of further steps to finish the signature generation process, such as will now be further described with respect to FIG. 3.

Figure 3:
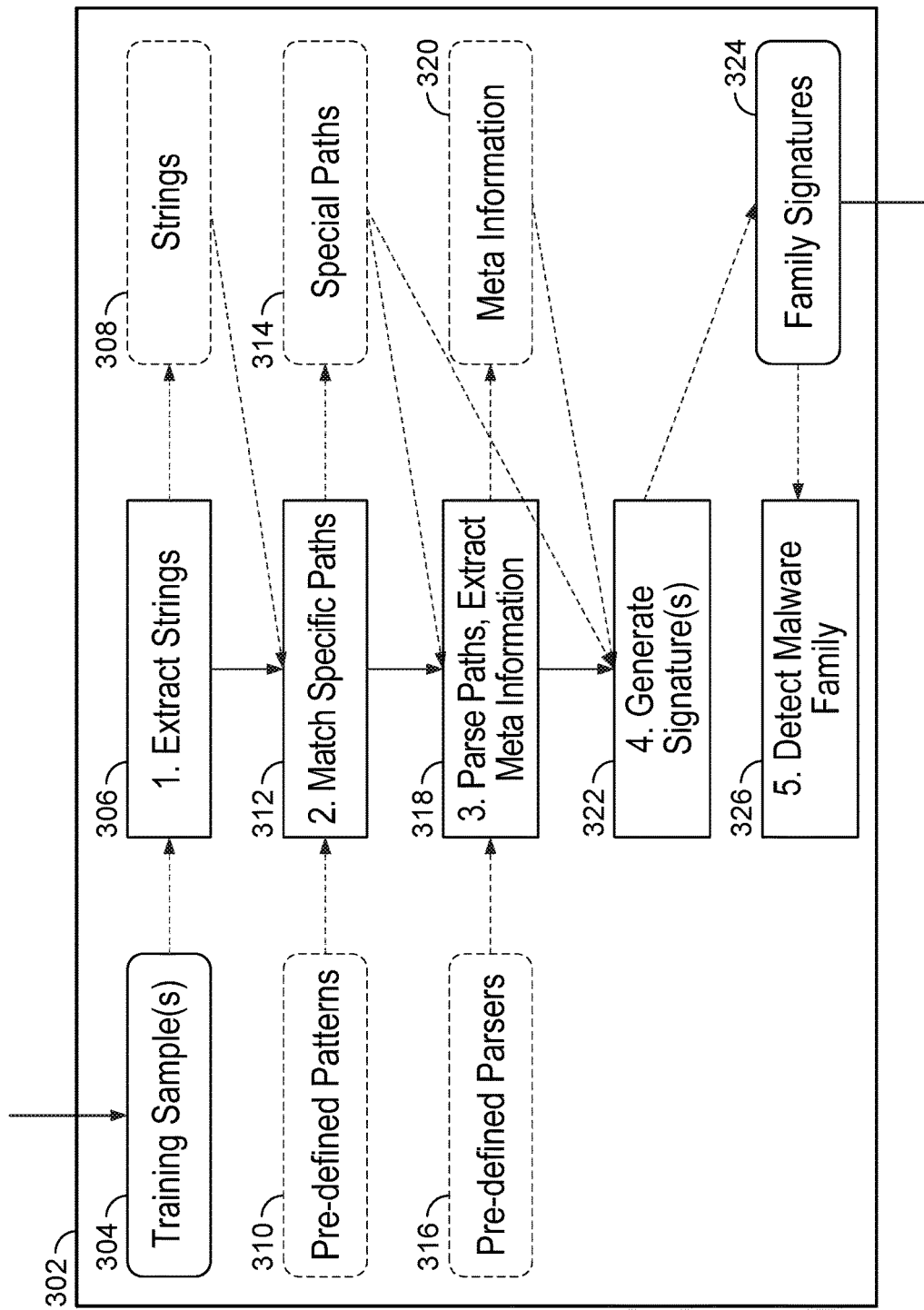
FIG. 3 is a component diagram of a system for generating malware signatures based on developer fingerprints in debug information in accordance with some embodiments.

Components for Generating Malware Signatures Based on Developer Fingerprints in Debug Information FIG. 3 is a component diagram of a system for generating malware signatures based on developer fingerprints in debug information in accordance with some embodiments. A variety of techniques for detection of malware based on developer fingerprints in debug information can be performed using example component architecture 302 as shown in FIG. 3 as further described below.

Debug Information in Executable Files

Generally source code for malware is programmed by a developer. In many cases (e.g., depending on the compiling tools/compiler (compiling tools) being used and/or the configuration of the compiling tools), when source code is compiled into an executable file, the compiling tools will add some special data into the binary executable file (e.g., executable file) to facilitate with debug operations (e.g., to help with any subsequent debugging operations using the compiling tools). This added special data is generally referred to as debug information (e.g., this debug information can be added to the executable file by the compiling tools to facilitate with debugging the executable file). When debugging the executable file (e.g., the compiled source code file), a developer may desire to monitor which line of code is executing and operate variables in the code. As such, the debug information can be used in this context to connect the source code and executable file. As an example, for each piece of binary code in the executable file, the debug information describes which source files the binary code was compiled from.

For example, for the Microsoft Windows® operating system (OS) platform, when using Microsoft's Visual Studio® compiling tool to compile a Windows PE (PE) executable file, or for the Apple Mac OS(R) X platform or iOS platform, when using Apple's Xcode compiling tool to compile a Mach-O executable file, if the project was configured in debug mode, the debug information will be added into the executable file by default.

In some cases, an executable file does not contain any such debug information (e.g., depending on the compiling tools being used and/or the configuration of the compiling tools as discussed above). In these cases, the disclosed techniques for generating malware signatures based on developer fingerprints in debug information would not be applicable to such executable files that do not contain any such debug information.

Overview of Components and Processing

In one embodiment, the disclosed techniques for generating malware signatures based on developer fingerprints in debug information are performed using component architecture 302 as will now be described. Whenever a particular component (e.g., logical component/feature) of component architecture 302 is described as performing a task, a sub-component may perform the task and/or the component may perform the task in conjunction with other components. In addition, various logical components/features of component architecture 302 may be omitted and the techniques described herein adapted accordingly. Similarly, additional logical components/features can be added to component architecture 302 as applicable.

In an example implementation, the disclosed techniques for generating malware signatures based on developer fingerprints in debug information include performing a multi-stage process that can be implemented using component architecture 302. In this example, the multi-stage process includes five distinct stages as described below.

Referring to FIG. 3, training samples are provided as input to a first stage as shown at 304 (e.g., the training samples can include any specific malware family as input, in which the malware samples include binary executable files that can be examined using the disclosed techniques). At the first stage, extracting strings from the training sample(s) (e.g., binary executable file(s)) is performed as shown at 306. The extracted strings are then output from this stage as shown at 308 and provided as input to the next stage as described below.

Pre-defined patterns are provided as input to a second stage as shown at 310. The extracted strings are also provided as input to the second stage as discussed above. At the second stage, matching specific paths in the extracted strings is performed as shown at 312. The matched special paths are then output from this stage as shown at 314 and provided as input to the next stage as described below.

Pre-defined parsers are provided as input to a third stage as shown at 316. The matched special paths (e.g., specific paths) are also provided as input to the third stage as discussed above. At the third stage, parsing the special paths and extracting meta information is performed as shown at 318. The extracted meta information is then output from this stage as shown at 320.

The matched special paths and extracted meta information are provided as input to a fourth stage as discussed above. At the fourth stage, generating a signature(s) (e.g., automatically generating a malware family signature) is performed as shown at 322. The generated signature(s) (e.g., family signature(s)) is then output from this stage as shown at 324.

As also shown in FIG. 3, the family signatures can be provided to a data appliance (e.g., a data appliance 102 as similarly described above with respect to FIGS. 1 and 2). At a fifth (optional) stage 326, the data appliance (e.g., or another security/networking product capable of applying the family signatures) can apply the family signatures to detect a malware family. For example, the family signature can be applied to new samples to determine that one or more of the new samples match the signature, and thus, can be determined to be a member of the malware family associated with the family signature (e.g., and one or more actions can be performed by the data appliance, such as to block, alert, log, and/or another action or remedial action can be performed).

The disclosed techniques for generating malware signatures based on developer fingerprints in debug information can be performed using the above-described components and process in accordance with some embodiments. The above-described outputs of extracted strings (308), matched special paths (314), and extracted meta information (320) will be described in more detail below.

Figure 4:
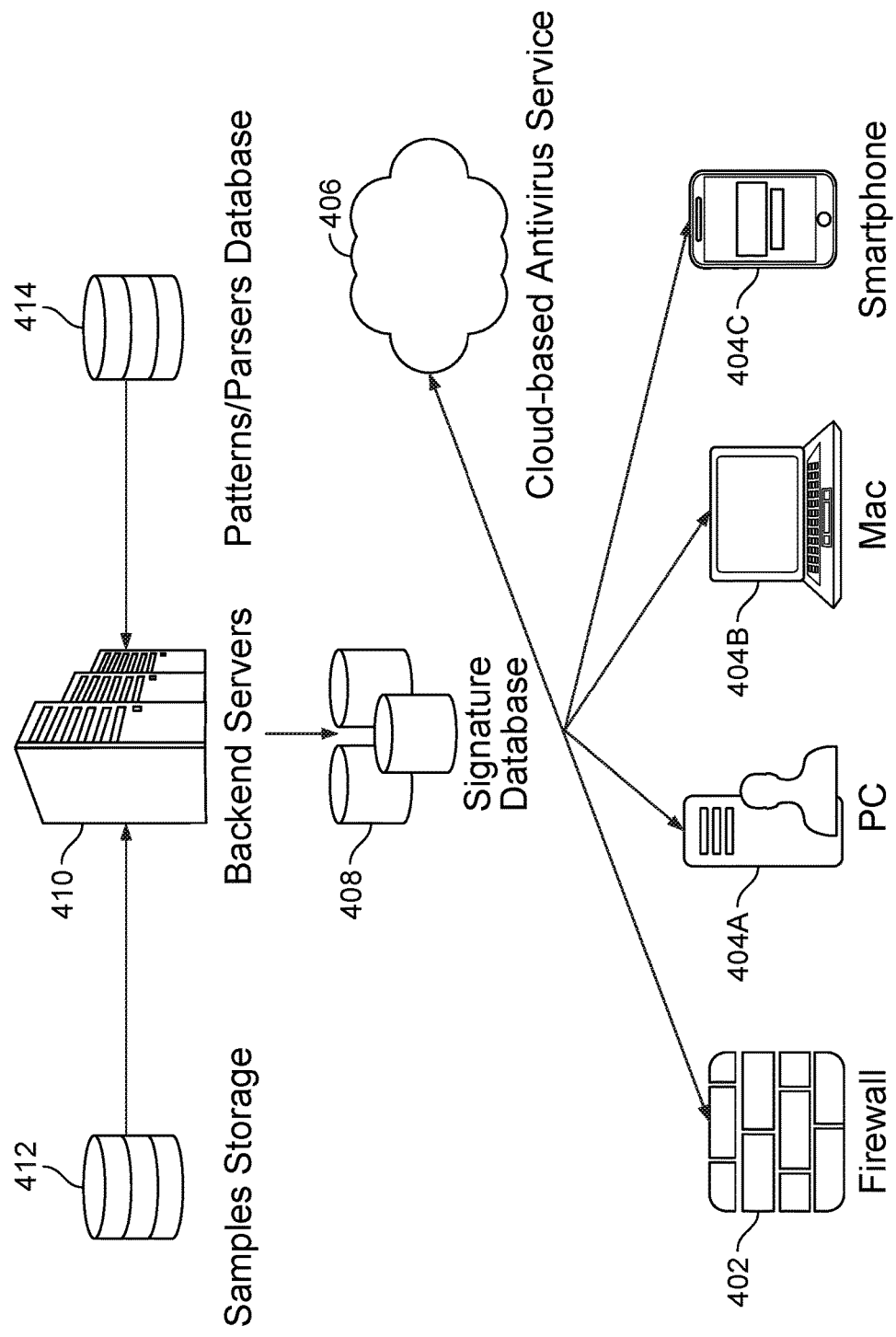
FIG. 4 is a system diagram of a physical computing environment for generating malware signatures based on developer fingerprints in debug information in accordance with some embodiments.

Physical System Environment for Generating Malware Signatures Based on Developer Fingerprints in Debug Information FIG. 4 is a system diagram of a physical computing environment for generating malware signatures based on developer fingerprints in debug information in accordance with some embodiments. A variety of techniques for detection of malware based on developer fingerprints in debug information can be performed using the example physical computing environment as shown in FIG. 4 as further described below.

In an example implementation, the disclosed techniques for detection of malware based on developer fingerprints in debug information can be implemented and/or deployed as a system as shown in the example physical computing environment of FIG. 4. In this example implementation, backend servers 410 store and execute a software implementation of the components and process as described above with respect to FIG. 3 (e.g., components 306, 312, 318, and 322 of component architecture 302 as shown in FIG. 3). The input samples (e.g., training samples 304 as shown in FIG. 3) are stored in a samples data store, shown as samples storage 412. The above-described two types of predefined data (e.g., pre-defined patterns 310 and pre-defined parsers 316 as shown in FIG. 3) are stored in patterns/parsers database 414 (e.g., a relational, object, or other type of database or another type of data store, such as an open source or commercially available database).

In this example implementation, backend servers 410 execute the above-described software implementation of the components and process of FIG. 3 (e.g., components 306, 312, 318, and 322 of component architecture 302 as shown in FIG. 3). The backend servers 410 send generated signatures to a signature database 408 (e.g., a relational, object, or other type of database or another type of data store, such as an open source or commercially available database, such as MySQL).

As similarly described above with respect to FIG. 3 (e.g., at stage 326 of FIG. 3), the generated signatures are provided to various security products/solutions, such as firewall 402 as shown in FIG. 4 (e.g., as an updating service and/or signature subscription service firewalls and/or antivirus products/solutions). In this example, cloud-based antivirus service 406 accesses signature database 408 to download and/or to update the malware family signatures to firewall 402 as shown in FIG. 4. Example security products/solutions include the following: network security devices such as a firewall (e.g., firewall 402 as shown in FIG. 4), unified threat management (UTM), intrusion detection system (IDS), intrusion prevention system (IPS), client/host-based antivirus software for end users (e.g., for various client platforms, such as on Microsoft Windows® OS devices, Apple Mac® OS devices, and Android, iOS, or other OS platforms for smartphones, tablets, smart watches, and/or other types of computing devices, such as example client devices 404A, 404B, and 404C as shown in FIG. 4), and security services, such as cloud-based security services (e.g., a cloud security service, such as the WildFire™ cloud-based malware analysis environment provided by Palo Alto Networks, Inc., and a cloud-based antivirus service provided by another security vendor(s)). These products can implement Step 5, or choose another way to use these signatures. FIG. 3 showed the relation between each component and the real world system.

Figure 5:
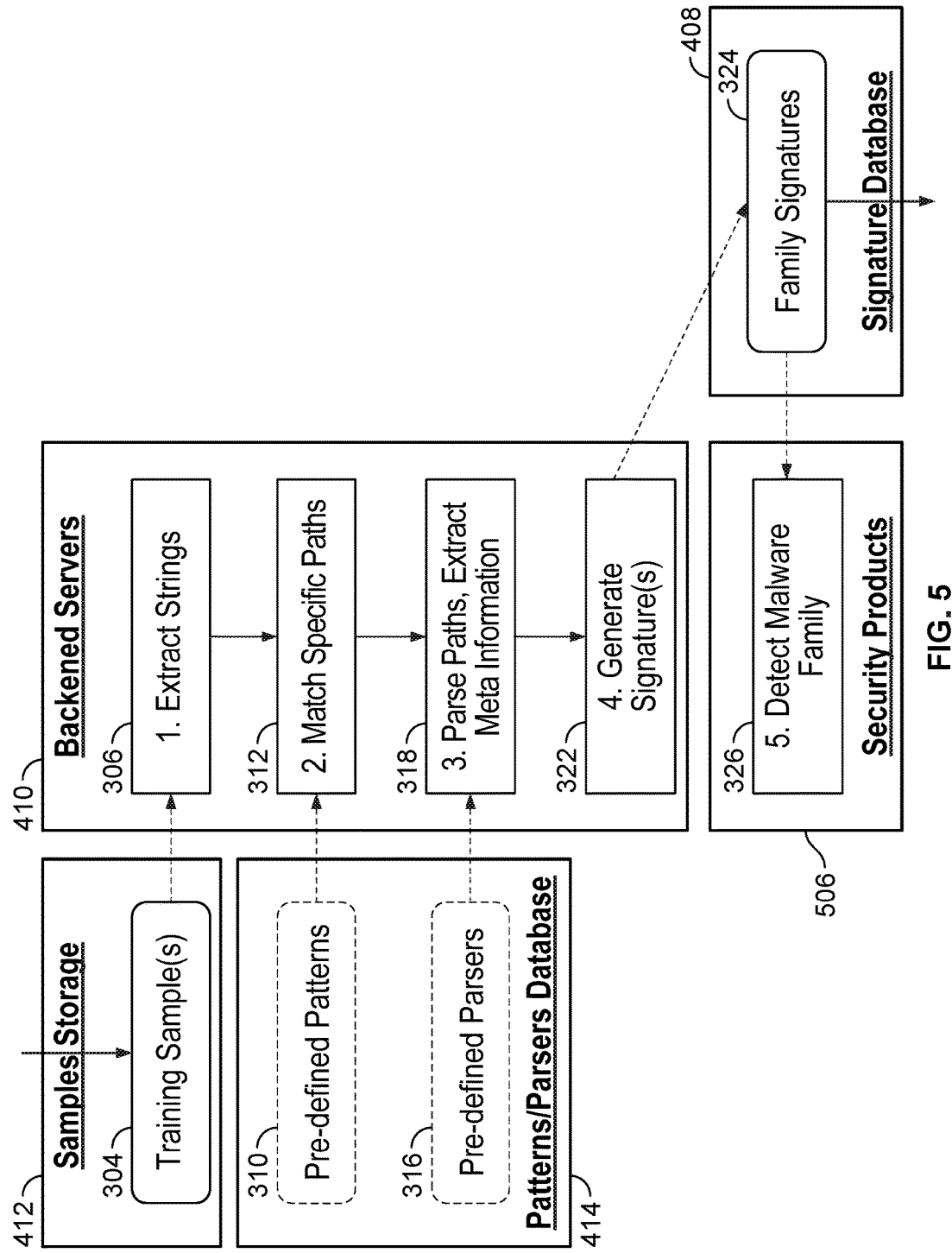
FIG. 5 is another component diagram of a system for generating malware signatures based on developer fingerprints in debug information in accordance with some embodiments.

FIG. 5 is another component diagram of a system for generating malware signatures based on developer fingerprints in debug information in accordance with some embodiments. A variety of techniques for detection of malware based on developer fingerprints in debug information can be performed using the example component architecture as shown in FIG. 5 as further described below.

Training Samples

In one embodiment, training samples include malware samples whose file format is a binary executable file format, such as PE, ELF or Mach-O executable file formats. As such, the disclosed system and process can consume malware sample files for Windows, Linux, Android, Mac OS X, and iOS platforms/systems, and the generated signatures can then be used to detect malware in these platforms, respectively.

In this example implementation, as the disclosed techniques are performed to extract malware family signatures, it is presupposed that the input malware samples have been known and determined to belong to a specific malware family (or families).

As also discussed above, the disclosed techniques do not require a minimum (or maximum) number of training samples in a given malware family for family signature generation. For example, even a set of only one sample as input for a given malware family can suffice for family signature generation using the disclosed techniques.

Detailed Description of Components and Processing

In one embodiment, the disclosed techniques for generating malware signatures based on developer fingerprints in debug information are performed using the example component architecture of FIG. 5 as will now be described. Whenever a particular component (e.g., logical component/feature) of the example component architecture of FIG. 5 is described as performing a task, a subcomponent may perform the task and/or the component may perform the task in conjunction with other components. In addition, various logical components/features of the example component architecture of FIG. 5 may be omitted and the techniques described herein adapted accordingly. Similarly, additional logical components/features can be added to the example component architecture of FIG. 5 as applicable.

In an example implementation, the disclosed techniques for generating malware signatures based on developer fingerprints in debug information include performing a multi-stage process that can be implemented using component architecture 302. In this example, the multi-stage process includes five distinct stages as described below.

Referring to FIG. 5, training sample(s) 304 of samples storage 412 are provided as input to a first stage as shown at 306 (e.g., the training samples can include any specific malware family as input, in which the malware samples include binary executable files that can be examined using the disclosed techniques, as similarly discussed above).

As also shown in FIG. 5, backend servers 410 store various components for performing the disclosed techniques for generating malware signatures based on developer fingerprints in debug information. At the first stage, extracting strings from the training sample(s) (e.g., binary executable file(s)) is performed as shown at 306. The extracted strings are then output from this stage and provided as input to the next stage as described below.

As also shown in FIG. 5, patterns/parsers database 414 stores pre-defined patterns 310 and pre-defined parsers 316. Pre-defined patterns 310 are provided as input to a second stage. The extracted strings are also provided as input to the second stage as discussed above. At the second stage, matching specific paths from the extracted strings is performed as shown at 312. The matched specific paths are then output from this stage and provided as input to the next stage as described below.

Pre-defined parsers 316 are provided as input to a third stage. The matched specific paths are also provided as input to the third stage as discussed above. At the third stage, parsing the special paths and extracting meta information is performed as shown at 318. The extracted meta information is then output from this stage and provided as input to the next stage as described below.

The matched special paths and extracted meta information are provided as input to a fourth stage as discussed above. At the fourth stage, generating a signature(s) (e.g., automatically generating a malware family signature) is performed as shown at 322. The generated signature(s) (e.g., family signature(s)) is then output from this stage and stored in signature database 408. Signature database 408 stores the generated family signatures 324 received from the processing performed by backend servers 410.

As also shown in FIG. 5, family signatures 324 can be provided to security products 506 (e.g., a data appliance 102 as similarly described above with respect to FIGS. 1 and 2 and/or cloud-based antivirus service 406 as described above with respect to FIG. 4). At a fifth (optional) stage, security products 506 (e.g., or another security/networking product capable of applying the family signatures) can apply the family signatures to detect a malware family. For example, the family signature can be applied to new samples to determine that one or more of the new samples match the signature, and thus, can be determined to be a member of the malware family associated with the family signature (e.g., and one or more actions can be performed by the data appliance, such as to block, alert, log, and/or another action or remedial action can be performed).

The disclosed techniques for generating malware signatures based on developer fingerprints in debug information can be performed using the above-described components and process in accordance with some embodiments. The above-described outputs of extracted strings (308), matched special paths (314), and extracted meta information (320) will now be described in more detail below.

As similarly discussed above, in some malware samples, various special paths can be detected in certain binary executable files of malware samples. Specifically, these special paths can include certain unique information (e.g., unique meta information) about the sample's developer, development environment, and/or development project's profile. As such, this unique meta information can then be extracted and used for malware family signature generation and detection, because other unknown samples in the same family may be compiled by the same developer, or in the same environment, and/or in the same project (e.g., and as a result, would match at least a subset of that extracted unique meta information).

Each of components 306, 312, 318, 322, and 326 including their processing operations and example implementation details will now be described in greater detail below.

(1) Extracting Strings from the Training Sample(s)

An initial stage of processing (e.g., the first stage of processing in this example implementation) includes extracting strings from the training sample(s) (e.g., executable files), such as further described below.

In one embodiment, existing tools or code can be used to parse the executable file and extract all strings and debug symbols in the executable file. For example, one or more of the following extraction operations can be performed: parse the PE, ELF, or Mach-O files' format, extract all strings in their string table; parse the PE, ELF, or Mach-O files' format, extract all symbols or strings in their debug symbols' section; and directly extract all strings in the PE, ELF, or Mach-O files' raw content (e.g., using "strings" command under Linux).

In an example implementation, to parse the PE, ELF or Mach-O file format, the following existing open source components can be used to perform these extracting operations. For extracting from PE files, https://pypi.python.org/pypi/pefile can be used to perform these extracting operations. For extracting from ELF files, https://github.com/eliben/pyelftools can be used to perform these extracting operations. For extracting from Mach-O files, https://pypi.python.org/pypi/macholib can be used to perform these extracting operations. As a result, a list of strings is extracted from the executable files. As will now be apparent, various other open source, commercially available, or proprietary components can similarly be selected, developed, and/or utilized to perform these extracting operations.

(2) Matching Specific File Paths

After extracting strings from the executable files, the next stage of processing (e.g., the second stage of processing in this example implementation) includes matching specific file paths in the extracted strings, such as further described below.

In debug information, except for common debug symbols and the mapping table, there are file paths of source code files, intermediate files, or debug symbol files, which are the desired specific file paths.

For example, in a PE file, the specific file path of interest may be similar to the following example file path:
C:\Users\de luca\Documents\Visual Studio 2010\Projects\AnonStress\AnonStress\obj\x86\Debug\AnonStress 1.1 (PRO).pdb For example, in an ELF file, the specific file path of interest may be similar to the following example file path:
/home/landley/work/ab7/build/temp-armv6l/gcc-core/gcc/config/arm/libIfuncs.asm For example, in a Mach-O file, the specific file path of interest may be similar to the following example file path:
/Users/lifei/Downloads/libimobiledevice/mobiledevice116/libimobiledevice-1.1.6/src/.libs/installation_proxy.o In this example of performing the second stage of the process, the operations include finding all of these paths in the extracted strings. As described above, a list of pre-defined patterns (e.g., pre-defined patterns 310) can be utilized to match specific kinds of paths in these strings. For example, these patterns can be manually configured/specified by security experts based on their knowledge and/or data statistics as well as machine learning techniques (MLT) can be utilized to generate these patterns.

An example way to represent these patterns is using a regular expression (regex), which could be directly stored as strings. Below are some examples of regular expressions that can be used as patterns.

For example, for PE files, the below regular expressions can be used to match specific paths of interest.
C:\\Users\\.*\\Visual\ Studio\ 20..\\
\\Visual\ Studio\ 20..\\.*\\.*\.pdb For example, for Mach-O files, the below regular expressions can be used to match specific paths of interest.
/Users/.*/.*\.[o|h|c|cpp|m|mm]
/Library/Developer/Xcode/DerivedData/
/Build/[Intermediates|Products]/
\.build/[Debug|Release|Default|Deployment|Distribution-|Objects-normal|.*\.build]/

For example, for ELF files, the below regular expressions can be used to match specific paths of interest.
/home/.*/.*\.[h|c|cpp|asm]
/home/.*/include Additional patterns or other matching logic by statistics and observation characteristics of various specific paths used for debugging can similarly be utilized for performing these matching specific paths operations.

In this example, for all strings output by the previous step, if the string or its substring matches any patterns above, then it is determined to be a file path that will be parsed in a next/later stage of processing.

An example in Python code is provided below.
```
import re
predefined patterns=[
    r'/Users/.*/.*\.[o|h|c|cpp|m|mm]',
    r'/Library/Developer/Xcode/DerivedData/',
    r'/Build/[Intermediates|Products]/',
]
special paths=[ ]
for s in extract_strings:
    for pattern in predefined_patterns:
        if re.compile(pattern).search(s):
            special_paths.append(s)
            break
```

(3) Parsing the Specific Paths and Extracting Meta Information

After matching the specific file paths, the next stage of processing (e.g., the third stage of processing in this example implementation) includes parsing the matched specific file paths and extracting useful meta information. In some cases, the specific file path itself or a subset of the specific file path (e.g., a substring of the specific file path) can also be used as a family signature or as a part of a family signature.

In this example of performing the third stage of the process, the operations include extracting different types of information about the developer and the project (e.g., meta information). As described above, a list of pre-defined parsers (e.g., pre-defined parsers 316) can be utilized to facilitate extracting meta information.

Examples of meta information that can be extracted include the following: a developer's user name in the machine he/she developed the malware in; a position of the project in the file system when it was compiled; a project's name; a project's unique ID; a project's source file structures (e.g., including a directory name, a source file name, and a file tree); a compiler and a compiler's version; and a project's compiling configuration. In some cases, not all paths contain all of the above-described example meta information.

As described above, in the second stage of processing in this example implementation, each output path is matched by at least one pattern. In this example, for each pattern, there is a pre-defined parser to parse information for the path. For example, the parsers can also be manually written by security experts by researching how each compiler works and based on various statistics of malware samples. As an example implementation, the parsers can be represented as Python code modules and stored as files (e.g., pre-defined parsers 316 stored on patterns/parsers database 414).

For example, an example pattern is provided below.
C:\\Users\\.*\\Visual\ Studio\ 20..\\

In this example, a "parser1.py" file can be developed, which includes the Python code provided below.
```
import re
def parser1(path):
    parsing_pattern=
        r'C:\\Users\\(?P<developer>.*)\\(?P<position>.*)\\Visual\
        Studio (?P<compiler_version> . . . )\\Projects\\
        (?P<project_name>\w+\\\w+)\\obj\\
        (?P<project_config>\w+\\\w+)\\(?P<source    file>.*)
        \..*'
    return re.match(parsing_pattern, path).groupdict( )
```

Consider the below example file path in a PE file:
C:\Users\de luca\Documents\Visual Studio 2010\Projects\AnonStress\AnonStress\obj\x86\Debug\AnonStress 1.1 (PRO).pdb This example file path in the PE file will be matched by the pattern above. Hence, it will be passed as a parameter of the "parser1( )" method defined in "parser1.py". In this example, the output will be as provided below.
{'project_name': 'AnonStress\\AnonStress', 'compiler_version': '2010', 'project_config': 'x86\\Debug', 'source_file': 'AnonStress 1.1 (PRO)', 'position': 'Documents', 'developer': 'de Luca'}

From the output, the below meta information can be extracted.
Developer's username: ' de luca'
Project's position in user's home directory: 'Documents'
Compiler's version: '2010'
Project's name: 'AnonStress\\AnonStress'
Project's compiling configuration: 'x86\\Debug'
Source file name: 'AnonStress 1.1 (PRO)'

In this example implementation, the parser, for any such kind of special path, performs the following operations to parse the specific paths: (1) some fixed substrings that also occurred in the matching pattern (e.g., "C:\Users\" and "\Visual Studio" in this example); and (2) some variable substrings in different positions, which have different meanings. As such, the parser can be used to distinguish which parts of the substring are fixed value and which are variable, and to determine an associated meaning with each variable substring (e.g., which can be implemented by security experts researching compilers and samples).

As an example for a Mach-O file, assume that the Mach-O file includes a file path as provided below.
/Users/guido/Library/Developer/Xcode/DerivedData/ mchook-fsdfgbbyqvoktnaxcomofhokqvua/Build/Intermediates/mchook.build/Release/mchook-64.build/DerivedSources/mchook-64_info.c In this example, parts of this path are as provided below (e.g., from a single sample file in this example).
/Users/: fixed value, useless
guido: developer's user name
/Library/Developer/Xcode/DerivedData/: fixed value, useless
mchook-fsdfgbbyqvoktnaxcomofhokqvua: project name is "mchook" and unique ID is "fsdfgbbyqvoktnaxcomofhokqvua"
/Build/Intermediates/: fixed value, useless
mchook.build/Release/mchook-64.build/DerivedSources/: compiling configs: in Release mode
mchook-64_info.c: a source file name Except for information from a single path, by comparing with different paths from the same samples, the project's source file structures can also be determined. For example, assume that in a Mach-O file there are the different file paths.
/Users/max/Projects/RefogMac/Source/Viewer/../Monitor/ EventEntity.m
/Users/max/Projects/RefogMac/Source/Viewer/../Monitor/ UserEntity.m
/Users/max/Projects/RefogMac/Source/Viewer/RefogApp.m
/Users/max/Projects/RefogMac/Source/Viewer/SmokeController.m In this example, based on the above different paths in the Mach-O file, it can then be determined that under the project's root directory, there is a "Source" directory that has a "Viewer" and a "Monitor" subdirectory, and under the "Viewer" there are "RefogApp.m" and "SmokeController.m" files.

(4) Generating Signatures and (5) Applying the Signatures

For each sample, multiple strings can be extracted in the initial stage of processing (e.g., the first stage of processing in this example implementation); multiple special/specific paths can be matched in the second stage of processing (e.g., the second stage of processing in this example implementation); and each special/specific path can result in a set of meta information in the third stage of processing (e.g., the third stage of processing in this example implementation). Also, in this example implementation, a single sample or multiple samples from a given malware family can be provided as input for processing using the above-described processing operations and disclosed techniques. Hence, in many cases, multiple sets of meta information from either a single sample or from multiple samples can be derived using the above-described processing operations and disclosed techniques. As a result, the derived meta information (e.g., extracted meta information) can be utilized to automatically generate signatures (e.g., malware family signatures) using various signature generation techniques as will now be further described below.

As a first example of how to utilize the extracted meta information to generate signatures, select any of the special paths and use the selected special path itself as a signature, or, select a subset of the special path (e.g., a substring of the special path) and use the substring as a signature. For a sample to be detected, if the special path existed in the binary executable of the sample, then the applied signature can detect the sample as belonging to the malware family in this example. Also, if there is more than one sample input for training, then a common special path that existed in each of the samples (e.g., or a threshold number of the samples, such as a majority or some other threshold) can be utilized as a signature.

As a second example of how to utilize the extracted meta information to generate signatures, certain of the extracted meta information can be utilized to generate a signature. After parsing a developer's username, a project name, a project's unique ID, and/or other meta information from a special path, a subset of the extracted meta information can be selected to construct a rule. For any new sample to be detected, if the sample has a string that includes all of the selected meta information in the rule (e.g., or a threshold match with the rule), then the applied signature (e.g., rule in this example) can detect the sample as belonging to the malware family in this example. Also, if there is more than one sample input for training and multiple meta information records from the different samples, then common records (e.g., common meta information) that existed in each of the samples (e.g., or a threshold number of the samples, such as a majority or some other threshold) can be utilized as described in this example to generate a signature.

As a third example of how to utilize the extracted meta information to generate signatures, another signature generation technique can be performed if multiple records of meta-information are extracted from a sample (e.g., multiple source file names are extracted). In this case, the multiple source file names can be combined together and used as a signature. For a new sample for detection, if the sample includes all of these file names (e.g., or a threshold number of these file names), then the applied signature can detect the sample as belonging to the malware family in this example.

As will be apparent, specific implementations of the generated family signatures can be constructed and represented differently depending on each security product's distinct or proprietary implementation.

Below are three examples of how to generate family signatures to actual malware families and their detection results.

Example 1

From a sample of a popular Adware on the Mac OS X platform named "Adware.OSX.Vsearch", there is a file path in the debug information as provided below.
/MacintoshHD/Sources/Cocoa/SIMBL/OverAll/VSInstallerHelper/build/VSInstallerHelper.build/Release/VSInstallerHelper.build/Objects-normal/i386/doTask.o In this example, the extracted string of this file path can be directly used as a family signature. Based on an example testing of 4,845 known samples in this family, 4,577 of them matched this signature (e.g., were detected using the above example signature based on the extracted string of the file path). As another example, if its prefix, such as "/MacintoshHD/Sources/Cocoa/SIMBL/OverAll/VSInstallerHelper/build/", is used as a family signature, the result based on testing was the same. As a result, both of these example generated signatures were determined to have a 94.5% detection rate and no false positives for popular Mac OS X applications based on the testing of these signatures.

Example 2

From a sample of a password stealer on the Microsoft Windows platform named "HackTool.Win32.Netpass.cif", there is a file path in the debug information as provided below.
C:\Users\Jovan\Documents\Visual Studio 2010\Projects\Stealer\CMemoryExecute\CMemory-Execute\obj\Release\CMemoryExecute.pdb By performing the above-described parsing paths operations, the developer's username is determined to be Jovan, the project name is Stealer, and a file in the project has the name of CMemoryExecute. Hence, a regular expression can be generated to be utilized as a signature, such as the regular expression provided below.
Jovan.*Stealer.*CMemoryExecute In this example, the signature's detection logic is that, for any detecting object, if the sample (e.g., executable file of the sample) includes a string that can match this regular expression, then the applied signature can detect the sample as belonging to the malware family. Based on an example testing of 500 known samples in this family, 352 of them matched this signature (e.g., were detected using this example regular expression). As a result, this example generated signature was determined to have a 70.4% detection rate.

Example 3

From a sample of a Spyware on the iOS platform named "Spyware.iPhoneOS.XAgent.a" (aka "PawnStorm"), there are various file paths in the debug information as provided below.
/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/XAAppDelegate.o/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/WiFi.o/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/InstalledApp.o/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/RecordVoice.o/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/Screenshot.o/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/XAInfoIphone.o/Users/mac/Library/Developer/Xcode/DerivedData/XAgent-azeuhvvhelifolbyqbjqwuwimdho/Build/Intermediates/XAgent.build/Debug-iphoneos/XAgent.build/Objects-normal/armv7s/SMS DataBase.o From these file paths, the above described processing operations and disclosed techniques can extract meta information and determine that the project unique ID is "azeuhvvhelifolbyqbjqwuwimdho" and in this project, there should be some source code files that have the following names (e.g., after strip extension name): XAAppDelegate, WiFi, InstalledApp, RecordVoice, Screenshot, XAInfoIphone, and SMS_DataBase.

Based on the extracted meta information in this example, two different example signatures can be generated. The first example signature can simply be based on the project's unique ID itself. The second example signature can be a combination of the source code file names.

In this example, the signature's detection logic is that, for any detecting object, if the sample (e.g., Mach-O executable file of the sample) includes these strings (e.g., the project's unique ID in a case of applying the first example signature; or the combination of the source code file names in a case of applying the second example signature), then the applied signature can detect the sample as belonging to the malware family.

Predefined Patterns and Predefined Parsers

In one embodiment, the disclosed techniques utilize predefined data including predefined patterns and predefined parsers, such as similarly described above. Specifically, the predefined patterns can be utilized to identify those special/specific paths that may include developer information and sample project information from the strings in a sample file. As such, the predefined parsers provide a mechanism to parse those special/specific paths to facilitate determination of more detailed and relevant meta information for purposes of performing the disclosed techniques for generating malware signatures based on developer fingerprints in debug information.

As similarly discussed above, the predefined patterns and predefined parsers can be manually written by security experts by researching how each compiler works and based on various statistics of malware samples.

As similarly discussed above, the predefined data can be written by security experts by knowledge of how each compiler works and by study and statistics of malware samples. We've also given some examples.

An example implementation of how to store such predefined data will now be described with respect to FIGS. 6 and 7.

FIG. 6 is a table of predefined patterns in accordance with some embodiments. In the example implementation shown in FIG. 6, the predefined patterns are stored in a table 602 in a data store (e.g., such as a database 414 as shown in FIGS. 4 and 5, which can be implemented using a relational, object, or other type of database or another type of data store such as a configuration file, such as an open source or commercially available database, such as MySQL). As shown, the pattern content is stored as a string in a column named "pattern." Each row has an "id" to index it. There is another "format" column to describe what kind of file format this pattern can be applied to (e.g., an optional column in this example implementation). As will now be apparent, these patterns can also be stored in any configuration file without using a database.

FIG. 7 is a table of predefined parsers and parser code in accordance with some embodiments. In the example implementation shown in FIG. 7, the predefined parsers are stored in a table 702 in a data store (e.g., such as a database 414 as shown in FIGS. 4 and 5, which can be implemented using a relational, object, or other type of database or another type of data store such as a configuration file, such as an open source or commercially available database, such as MySQL). As also shown, this example includes parser code as shown at 704. In this example implementation, the table/config maps each pattern (by its "id") to a piece of code that can parse any path that matched the pattern.

Additional example processes using the disclosed techniques for generating malware signatures based on developer fingerprints in debug information will now be described.

Figure 8:
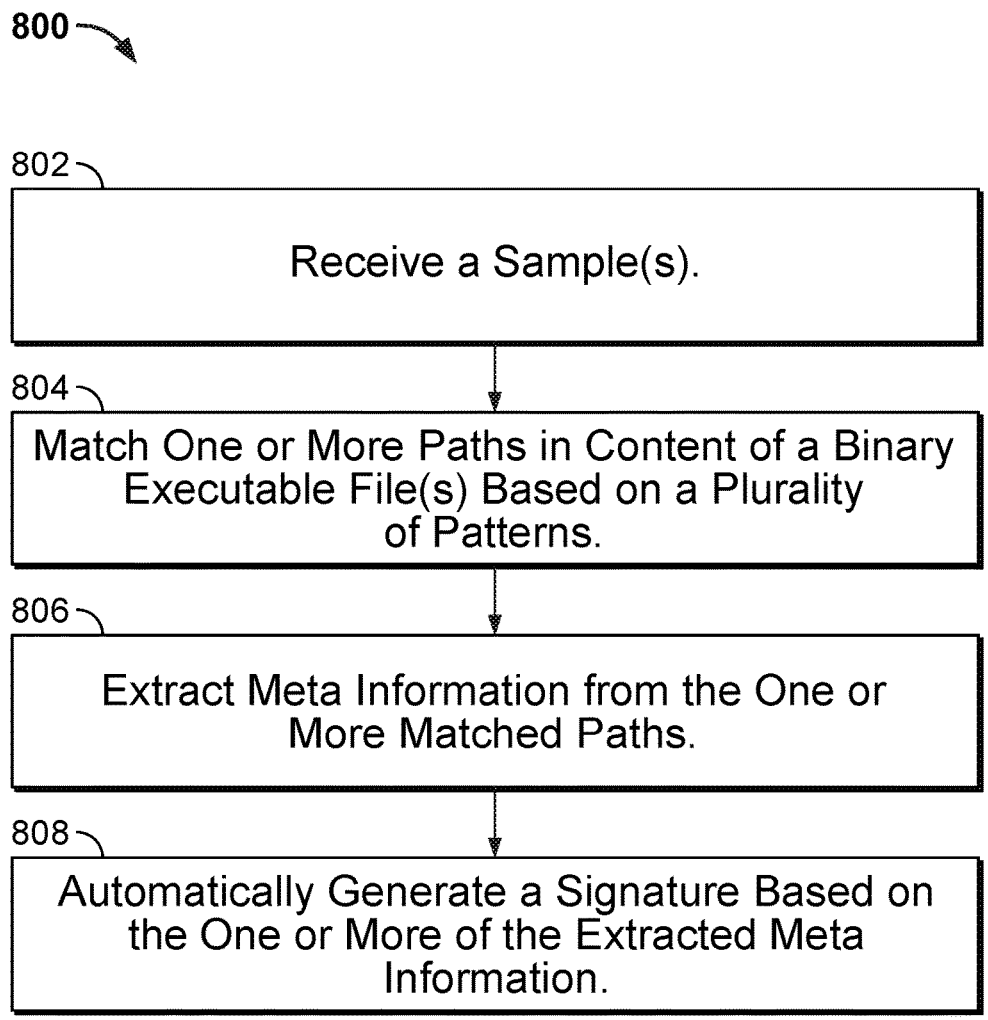
FIG. 8 is a flow diagram for a process generating malware signatures based on developer fingerprints in debug information in accordance with some embodiments.

Processes for Generating Malware Signatures Based on Developer Fingerprints in Debug Information FIG. 8 is a flow diagram of a process for generating malware signatures based on developer fingerprints in debug information in accordance with some embodiments. In some embodiments, a process 800 as shown in FIG. 8 is performed by the platform and techniques as similarly described above including the embodiments described above with respect to FIGS. 1-7.

In one embodiment, process 800 is performed by data appliance 102 or cloud security service 122. The process begins at 802 when a sample(s) is received. For example, one or more samples (e.g., each sample includes a binary executable file) known to be in a given malware family (e.g., previously determined to be members of that malware family) can be received for performing the disclosed techniques for generating malware signatures based on developer fingerprints in debug information as described herein.

At 804, matching one or more paths in content of a binary executable file(s) based on a plurality of patterns is performed. For example, one or more specific paths can be matched using pre-defined patterns as similarly described above.

At 806, extracting meta information from the one or more matched paths is performed. For example, meta information can be extracted from debug information in the executable file to uniquely identify a developer as similarly described above.

At 808, automatically generating a signature based on the extracted meta information is performed. For example, the generated signature can be a family signature as similarly described above.

Figure 9:
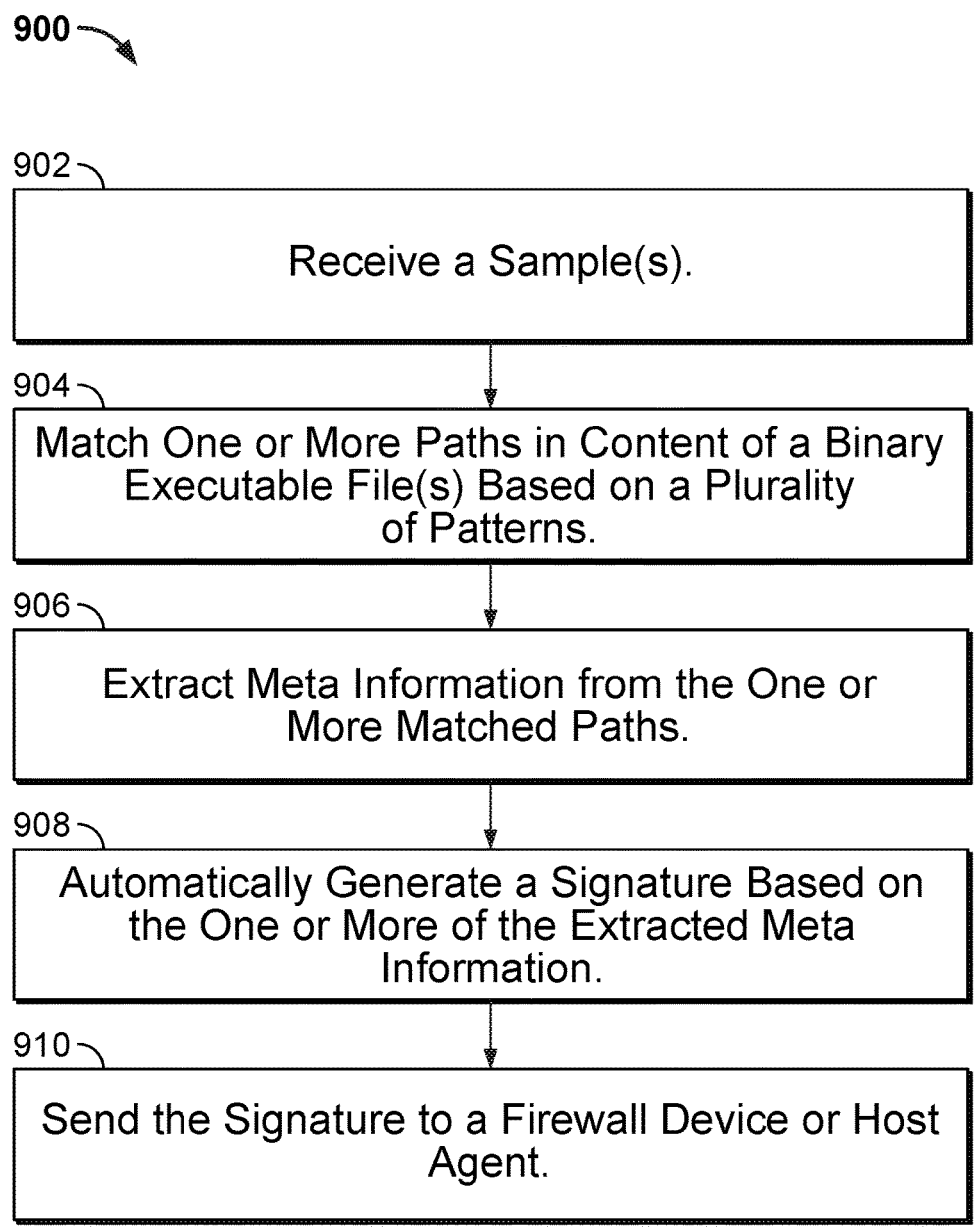
FIG. 9 is another flow diagram for a process generating malware signatures based on developer fingerprints in debug information in accordance with some embodiments.

FIG. 9 is another flow diagram for a process generating malware signatures based on developer fingerprints in debug information in accordance with some embodiments. In some embodiments, a process 900 as shown in FIG. 9 is performed by the platform and techniques as similarly described above including the embodiments described above with respect to FIGS. 1-7.

In one embodiment, process 900 is performed by data appliance 102 or cloud security service 122. The process begins at 902 when a sample(s) is received. For example, one or more samples (e.g., each sample includes a binary executable file) known to be in a given malware family (e.g., previously determined to be members of that malware family) can be received for performing the disclosed techniques for generating malware signatures based on developer fingerprints in debug information as described herein.

At 904, matching one or more paths in content of a binary executable file(s) based on a plurality of patterns is performed. For example, one or more specific paths can be matched using pre-defined patterns as similarly described above.

At 906, extracting meta information from the one or more matched paths is performed. For example, meta information can be extracted from debug information in the executable file to uniquely identify a developer as similarly described above.

At 908, automatically generating a signature based on the extracted meta information is performed. For example, the generated signature can be a family signature as similarly described above.

At 910, the signature is sent to a firewall device or a host agent. For example, the generated signature can be distributed to one or more firewall devices or host agents that can perform actions based on matches with the signature (e.g., block, alert, quarantine, and/or perform other actions) as similarly described above.

Figure 10:
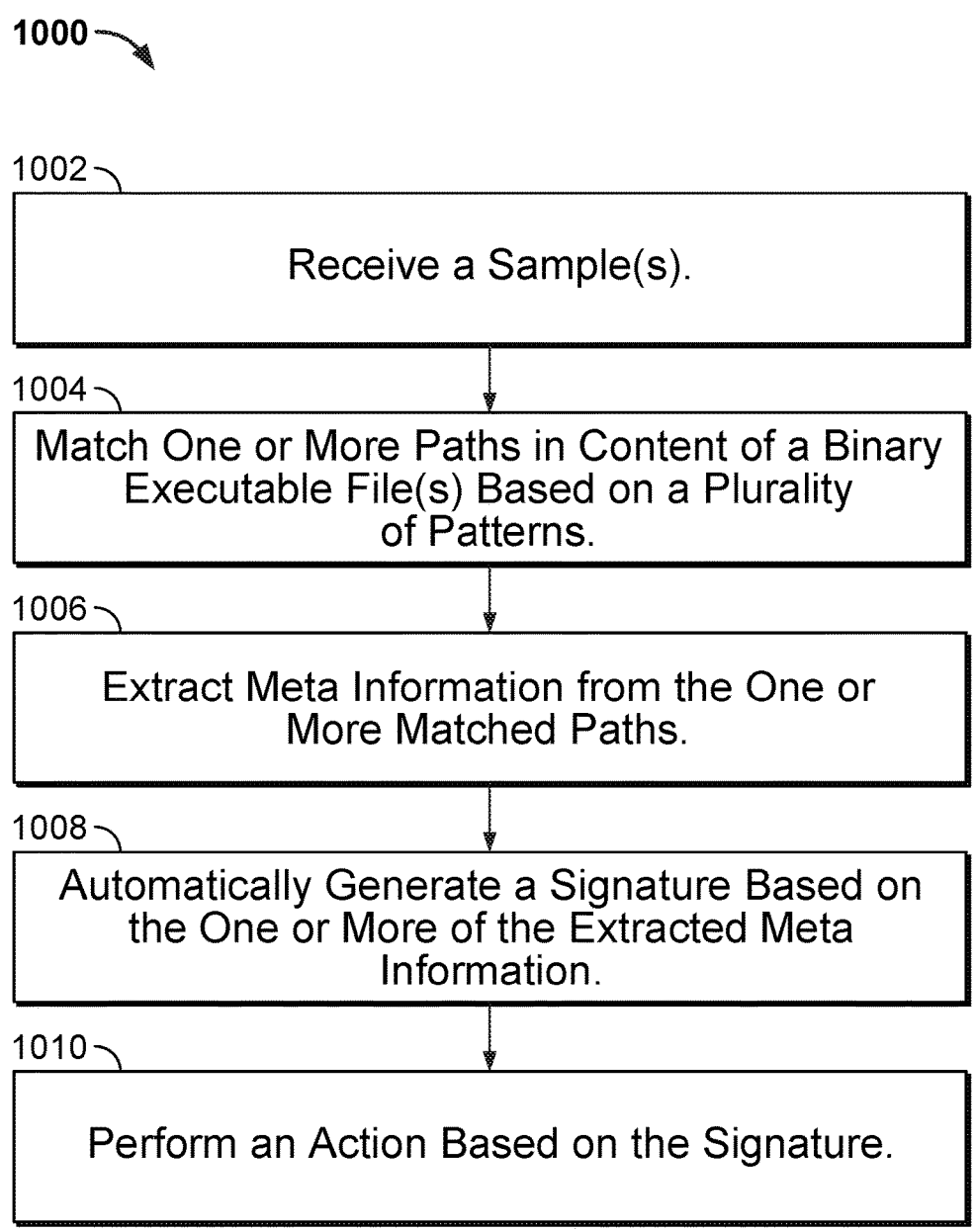
FIG. 10 is another flow diagram of a process for generating malware signatures based on developer fingerprints in debug information in accordance with some embodiments.

FIG. 10 is another flow diagram for a process generating malware signatures based on developer fingerprints in debug information in accordance with some embodiments. In some embodiments, a process 1000 as shown in FIG. 10 is performed by the platform and techniques as similarly described above including the embodiments described above with respect to FIGS. 1-7.

In one embodiment, process 1000 is performed by data appliance 102 or cloud security service 122. The process begins at 1002 when a sample(s) is received. For example, one or more samples known to be in a given malware family (e.g., previously determined to be members of that malware family) can be received for performing the disclosed techniques for generating malware signatures based on developer fingerprints in debug information as described herein.

At 1004, matching one or more paths in content of a binary executable file(s) based on a plurality of patterns is performed. For example, one or more specific paths can be matched using pre-defined patterns as similarly described above.

At 1006, extracting meta information from the one or more matched paths is performed. For example, meta information can be extracted from debug information in the executable file to uniquely identify a developer as similarly described above.

At 1008, automatically generating a signature based on the extracted meta information is performed. For example, the generated signature can be a family signature as similarly described above.

At 1010, an action is performed based on the signature. For example, the generated signature can be applied by a firewall device or a host agent to perform actions based on matches with the signature (e.g., block, alert, quarantine, and/or perform other actions) as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
 a processor configured to:
  receive a sample, wherein the sample includes a binary executable file;
  match one or more paths in content of the binary executable file based on a plurality of patterns, comprising to:
   extract a first string from the binary executable file, wherein the first string relates to debug information of the binary executable file;
   determine whether a path associated with the first string matches a pattern of the plurality of patterns, the pattern including a regular expression; and in response to a determination that the path matches the pattern, determine that the path is a matched path;

extract meta information from the one or more matched paths, comprising to:
parse a second string associated with the one or more matched paths to obtain the meta information, wherein the meta information is obtained from the second string itself, a subset of the second string, or both; and
automatically generate a signature based on the extracted meta information; and a memory coupled to the processor and configured to provide the processor with instructions.

2. The system recited in claim 1, wherein the extracted meta information comprises a developer fingerprint in debug information.

3. The system recited in claim 1, wherein the sample comprises a plurality of samples associated with a malware family, wherein each of the plurality of samples includes a binary executable file, wherein the signature is generated based on meta information that is common across the malware family and is extracted from each of the plurality of samples, and wherein the signature is a malware family signature.

4. The system recited in claim 1, wherein the signature is a malware family signature that is generated based on the extracted meta information.

5. The system recited in claim 1, wherein the binary executable file is associated with a malware family based on the extracted meta information.

6. The system recited in claim 1, wherein the processor is further configured to:
send the signature to a firewall device or a host agent.

7. The system recited in claim 1, wherein the processor is further configured to:
perform an action based on the signature.

8. A method, comprising:
receiving a sample, wherein the sample includes a binary executable file;
matching one or more paths in content of the binary executable file based on a plurality of patterns, comprising:
extracting a first string from the binary executable file, wherein the first string relates to debug information of the binary executable file;
determining whether a path associated with the first string matches a pattern of the plurality of patterns, the pattern including a regular expression; and
in response to a determination that the path matches the pattern, determining that the path is a matched path;
extracting meta information from the one or more matched paths, comprising:
parsing a second string associated with the one or more matched paths to obtain the meta information, wherein the meta information is obtained from the second string itself, a subset of the second string, or both; and
automatically generating a signature based on the extracted meta information.

9. The method of claim 8, wherein the extracted meta information comprises a developer fingerprint in debug information.

10. The method of claim 8, wherein the sample comprises a plurality of samples associated with a malware family, wherein each of the plurality of samples includes a binary executable file, wherein the signature is generated based on meta information that is common across the malware family and is extracted from each of the plurality of samples, and wherein the signature is a malware family signature.

11. The method of claim 8, wherein the signature is a malware family signature that is generated based on the extracted meta information.

12. The method of claim 8, wherein the binary executable file is associated with a malware family based on the extracted meta information.

13. The method of claim 8, further comprising:
sending the signature to a firewall device or a host agent.

14. The method of claim 8, further comprising:
performing an action based on the signature.

15. A computer program product, the computer program product being embodied in a tangible non-transitory computer readable storage medium and comprising computer instructions for:
receiving a sample, wherein the sample includes a binary executable file;
matching one or more paths in content of the binary executable file based on a plurality of patterns, comprising:
extracting a first string from the binary executable file, wherein the first string relates to debug information of the binary executable file;
determining whether a path associated with the first string matches a pattern of the plurality of patterns, the pattern including a regular expression; and
in response to a determination that the path matches the pattern, determining that the path is a matched path;
extracting meta information from the one or more matched paths, comprising:
parsing a second string associated with the one or more matched paths to obtain the meta information, wherein the meta information is obtained from the second string itself, a subset of the second string, or both; and
automatically generating a signature based on the extracted meta information.

16. The computer program product recited in claim 15, wherein the extracted meta information comprises a developer fingerprint in debug information.

17. The computer program product recited in claim 15, wherein the sample comprises a plurality of samples associated with a malware family, wherein each of the plurality of samples includes a binary executable file, wherein the signature is generated based on meta information that is common across the malware family and is extracted from each of the plurality of samples, and wherein the signature is a malware family signature.

18. The computer program product recited in claim 15, wherein the binary executable file is associated with a malware family based on the extracted meta information.

19. The computer program product recited in claim 15, further comprising computer instructions for:
sending the signature to a firewall device or a host agent.

20. The computer program product recited in claim 15, further comprising computer instructions for:
performing an action based on the signature.

* * * * *

UNITED STATES PATENT AND TRADEMARK OFFICE
CERTIFICATE OF CORRECTION

PATENT NO. : 9,992,214 B1
APPLICATION NO. : 15/083070
DATED : June 5, 2018
INVENTOR(S) : Zihang Xiao Page 1 of 1

It is certified that error appears in the above-identified patent and that said Letters Patent is hereby corrected as shown below:

On the Title Page

Column 2, Item (56), References Cited, Other Publications, Cite No. 2,
delete "Malware etection" and insert --Malware detection--, therefor.

In the Specification

In Column 15, Line 52, delete "predefined patterns" and insert --predefined_patterns--, therefor.

In Column 15, Line 57, delete "special paths" and insert --special_paths--, therefor.

In Column 16, Line 41, delete "(?P<source file>.*)" and insert --(?P<source_file>.*)--, therefor.

In Column 19, Line 63, delete "SMS DataBase.o" and insert --SMS_DataBase.o--, therefor.

Signed and Sealed this
Thirtieth Day of October, 2018

Andrei Iancu
*Director of the United States Patent and Trademark Office*